United States Patent
Ose et al.

(10) Patent No.: US 9,985,314 B2
(45) Date of Patent: May 29, 2018

(54) ALL-SOLID BATTERY AND METHOD FOR MANUFACTURING THE SAME

(71) Applicants: Norihiro Ose, Sunto-gun (JP); Kengo Haga, Susono (JP); Tomoharu Sasaoka, Hadano (JP)

(72) Inventors: Norihiro Ose, Sunto-gun (JP); Kengo Haga, Susono (JP); Tomoharu Sasaoka, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 325 days.

(21) Appl. No.: 14/655,816

(22) PCT Filed: Jan. 14, 2014

(86) PCT No.: PCT/IB2014/000032
§ 371 (c)(1),
(2) Date: Jun. 26, 2015

(87) PCT Pub. No.: WO2014/111791
PCT Pub. Date: Jul. 24, 2014

(65) Prior Publication Data
US 2015/0349378 A1  Dec. 3, 2015

(30) Foreign Application Priority Data
Jan. 15, 2013  (JP) ................. 2013-004880

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0445* (2013.01); *H01M 4/0471* (2013.01);
(Continued)

(58) Field of Classification Search
CPC .......... H01M 10/0562; H01M 4/0445; H01M 10/0585; H01M 4/62; H01M 4/139;
(Continued)

(56) References Cited

U.S. PATENT DOCUMENTS

2009/0246629 A1 * 10/2009 Nagai ................ H01M 4/0404
429/209
2010/0297479 A1  11/2010 Tsuchida et al.
(Continued)

FOREIGN PATENT DOCUMENTS

JP  2009-193727 A  8/2009
JP  2010-033918 A  2/2010
(Continued)

OTHER PUBLICATIONS

Machine English translation of JP2012-243476 to Isshiki.*

*Primary Examiner* — Michael L Dignan
(74) *Attorney, Agent, or Firm* — Oliff PLC (57) ABSTRACT

A method is provided for preparing an all-solid battery that at least includes a negative electrode layer containing a negative electrode active material and a sulfide solid electrolyte, and a negative electrode current collector containing a metal that is in contact with the negative electrode layer and can react with the sulfide solid electrolyte, in which a sulfur compound generated by a reaction of the metal contained in the negative electrode current collector and the sulfide solid electrolyte contained in the negative electrode layer is not present in a contact portion of the negative electrode layer and the negative electrode current collector.

3 Claims, 3 Drawing Sheets (51) Int. Cl.
  *H01M 4/139* (2010.01)
  *H01M 4/62* (2006.01)
  *H01M 10/0585* (2010.01)
  *H01M 4/1393* (2010.01)
  *H01M 4/66* (2006.01)
  *H01M 10/052* (2010.01)

(52) U.S. Cl.
  CPC ............ *H01M 4/139* (2013.01); *H01M 4/62* (2013.01); *H01M 10/0585* (2013.01); *H01M 4/1393* (2013.01); *H01M 4/661* (2013.01); *H01M 10/052* (2013.01); *H01M 2300/0068* (2013.01); *Y10T 29/4911* (2015.01)

(58) Field of Classification Search
  CPC ............ H01M 4/0471; H01M 10/052; H01M 4/1393; H01M 2300/0068; H01M 4/661; Y10T 29/4911
  See application file for complete search history.

(56) References Cited

U.S. PATENT DOCUMENTS

| | | | |
|---|---|---|---|
| 2011/0065007 A1* | 3/2011 | Kamiya | H01M 10/0562 429/322 |
| 2014/0082931 A1 | 3/2014 | Nishino et al. | |

FOREIGN PATENT DOCUMENTS

| | | |
|---|---|---|
| JP | 2011-060649 A | 3/2011 |
| JP | 2012-049023 A | 3/2012 |
| JP | 2012-094437 A | 5/2012 |
| JP | 2012-199003 A | 10/2012 |
| JP | 2012-243476 A | 12/2012 |
| JP | 2012-248412 A | 12/2012 |
| JP | 2012-256436 A | 12/2012 |
| JP | 2014-137868 A | 7/2014 |
| WO | 2012/164723 A1 | 12/2012 |
| WO | 2013/179120 A1 | 12/2013 |
| WO | 2014/111789 A1 | 7/2014 |

* cited by examiner

ALL-SOLID BATTERY AND METHOD FOR MANUFACTURING THE SAME

BACKGROUND OF THE INVENTION

1. Field of the Invention

The invention relates to an all-solid battery and a method for manufacturing the same.

2. Description of Related Art

A lithium ion secondary battery has an energy density higher than that of a conventional secondary battery and can be operated at high voltages. Therefore, it is used in information instruments such as cellular phones and the like as a secondary battery that can be readily down-sized and light-weighted. In recent years, the lithium ion secondary battery has a high demand also for large engines such as those in electric vehicles, hybrid vehicles, and the like.

A lithium ion secondary battery has a positive electrode layer, a negative electrode layer, and an electrolyte layer disposed therebetween. As the electrolyte used in the electrolyte layer, for example, a nonaqueous liquid or solid substance is known. When the liquid electrolyte (hereinafter, referred to as "electrolytic solution") is used, the electrolytic solution is likely to permeate to the inside of the positive electrode layer or negative electrode layer. Therefore, an interface is likely to be formed between an active material contained in the positive electrode layer or negative electrode layer and the electrolytic solution, and performance is likely to be improved thereby. However, since the electrolytic solution that is broadly used is inflammable, a system for securing safety has to be mounted. On the other hand, when a solid electrolyte that is non-flammable (hereinafter, referred to as "solid electrolyte") is used, the system can be simplified. Therefore, a lithium ion secondary battery (hereinafter, referred to as "all-solid battery") having a form provided with a layer that contains the solid electrolyte (hereinafter, referred to as "solid electrolyte layer" in some cases) is under development.

As a technique relating to such an all-solid battery, Japanese Patent Application Publication No. 2011-060649 (JP 2011-060649 A) for example discloses an electrode active material layer that includes an electrode active material and a sulfide solid electrolyte material that fuses to a surface of the electrode active material and does not substantially contain cross-linked sulfur, and an all-solid battery provided with the electrode active material layer. Further, Japanese Patent Application Publication No. 2012-094437 (JP 2012-094437 A) discloses an all-solid battery that includes a positive electrode active material layer that contains a positive electrode active material, a negative electrode active material layer that contains a negative electrode active material, and a solid electrolyte layer formed between the positive electrode active material layer and negative electrode active material layer, in the all-solid battery, the solid electrolyte layer is obtained by powder compacting a solid electrolyte material, and in a gap between the solid electrolyte materials an insulating material having a withstand voltage higher than argon is disposed.

In the all-solid battery, from the viewpoint that performance can be readily improved, a sulfide solid electrolyte is used as the solid electrolyte in some cases. Also Japanese Patent Application Publication Nos. 2011-060649 and 2012-094437 (JP-2011-060649 A and 2012-094437 A) disclose an all-solid battery that includes a negative electrode layer containing a sulfide solid electrolyte. Further, Cu is broadly used as a negative electrode current collector for all-solid batteries because it has low electric resistivity, can be readily processed and is low in cost. Also JP 2011-060649 A and 2012-094437A disclose that Cu is used as the negative electrode current collector. Further, in a manufacturing process of the all-solid battery, heat is usually applied. JP 2012-094437 A discloses a manufacturing example of an all-solid battery, in which after a negative electrode layer was formed on a negative electrode current collector, a hot-press process is conducted at 150° C.

SUMMARY OF THE INVENTION

When a metal that reacts with sulfur such as Cu is used in the negative electrode current collector in the all-solid battery that includes a negative electrode layer that contains sulfur (a negative electrode layer that contains a sulfide solid electrolyte, for example), a problem is caused, in which due to a sulfur compound that is generated by a reaction of the metal with the sulfide solid electrolyte, capacity of the all-solid battery is decreased. Further, generation of the sulfur compound is promoted in a high temperature environment. That is, like techniques disclosed in the JP 2011-060649 A and JP 2012-094437 A, when the negative electrode layer that contains the sulfide solid electrolyte and the negative electrode current collector made of Cu or the like are heated at high temperatures in a contact state in a manufacturing process of the all-solid battery, the sulfur compound is generated in a contact portion of the negative electrode current collector and the negative electrode layer, and capacity of the all-solid battery may be decreased thereby.

Therefore, the invention provides an all-solid battery in which capacity is hindered from decreasing and a negative electrode layer contains sulfur. Further, the invention provides a method for manufacturing the all-solid battery.

The inventors found, as described above, that the sulfur compound generated by a reaction between sulfur contained in the negative electrode layer and the metal contained in the negative electrode current collector decreased capacity of the all-solid battery. When Cu is used in the negative electrode current collector, for example, the Cu reacts with the sulfide solid electrolyte contained in the negative electrode layer and generates cupper sulfide. In a general use environment of a battery, a Li ion is inserted in copper sulfide but the inserted Li is not released. Therefore, when copper sulfide is generated in a contact portion of the negative electrode layer and negative electrode current collector, a Li ion is inserted in the copper sulfide, and battery capacity is decreased thereby. Such a problem is generated in the same manner also in the case when Fe, Ni, Co, or Ti other than Cu is used as the negative electrode current collector.

As described above, when the sulfur compound generated by a reaction of sulfur contained in the negative electrode layer and the metal contained in the negative electrode current collector is suppressed from being generated, the capacity of the all-solid battery can be suppressed from decreasing. Further, by adjusting a temperature or a battery voltage in a manufacturing process of the all-solid battery, the sulfur compound can be suppressed from being generated.

A first aspect of the invention relates to an all-solid battery that at least includes a negative electrode layer that contains a negative electrode active material and a sulfide solid electrolyte, and a negative electrode current collector containing a metal that is in contact with the negative electrode layer and can react with the sulfide solid electrolyte, in which a sulfur compound that is generated by a reaction of the metal contained in the negative electrode current collector and the sulfide solid electrolyte contained in the negative electrode layer does not exist in a contact portion of the negative electrode layer with the negative electrode current collector.

In the invention, "a metal that can react with a sulfide solid electrolyte" may be a metal that can generate a sulfur compound when heated in contact with the sulfide solid electrolyte. Specific examples of such metals include Cu, Fe, Ni, Co, and Ti. Further, "a sulfur compound does not exist" may mean that a molar amount of the metal element/a molar amount of sulfur (S) that constitute the sulfur compound may be 0/01 or less in a measurement result by energy dispersive X-ray spectroscopy (EDX).

According to the first aspect of the invention, the negative electrode current collector may contain Cu and/or Fe.

When copper sulfide that is generated by a reaction of Cu and the sulfide solid electrolyte or iron sulfide that is generated by a reaction of Fe and the sulfide solid electrolyte is present in a contact portion of the negative electrode layer with the negative electrode current collector, capacity of the all-solid battery is decreased. When these sulfur compounds are not present in the contact portion of the negative electrode layer with the negative electrode current collector, capacity of the all-solid battery can be suppressed from decreasing.

A second aspect of the invention relates to a method for manufacturing an all-solid battery that at least includes a negative electrode layer that contains a negative electrode active material and a sulfide solid electrolyte and a negative electrode current collector that contains a metal that is in contact with the negative electrode layer and is able to react with the sulfide solid electrolyte, in which after the negative electrode current collector and the negative electrode layer was brought into contact, a step where a contact portion of the negative electrode layer with the negative electrode current collector is heated to a temperature at which the metal contained in the negative electrode current collector reacts with the sulfide solid electrolyte contained in the negative electrode layer or more is not contained.

The inventors found that the reaction between the metal contained in the negative electrode current collector and the sulfide solid electrolyte contained in the negative electrode layer was promoted under a high temperature environment. Therefore, by removing a step where a contact portion of the negative electrode layer with the negative electrode current collector is heated to a temperature at which the metal contained in the negative electrode current collector reacts with the sulfide solid electrolyte contained in the negative electrode layer or more after the negative electrode current collector and the negative electrode layer were brought into contact, the reaction of the metal contained in the negative electrode current collector and the sulfide solid electrolyte contained in the negative electrode layer can be suppressed in the contact portion of the negative electrode layer with the negative electrode current collector. As a result, the capacity of the all-solid battery can be suppressed from decreasing.

In the second aspect described above of the invention, when the metal contained in the negative electrode current collector is Cu, it is preferable that a step where the contact portion of the negative electrode layer with the negative electrode current collector exceeds 100° C. is not contained after the negative electrode current collector was brought into contact with the negative electrode layer.

The inventors found that the reaction of Cu and the sulfide solid electrolyte is promoted under an environment that exceeds 100° C. Therefore, a step where the contact portion of the negative electrode layer with the negative electrode current collector exceeds 100° C. may not be contained after the negative electrode current collector that contains Cu is brought into contact with the negative electrode layer. Thus, the reaction of the metal contained in the negative electrode current collector and the sulfide solid electrolyte contained in the negative electrode layer can be suppressed in the contact portion of the negative electrode layer with the negative electrode current collector. As a result, capacity of the all-solid battery can be suppressed from decreasing.

In the second aspect described above of the invention, when the metal contained in the negative electrode current collector is Fe, a step where a contact portion of the negative electrode layer with the negative electrode current collector exceeds 125° C. may not be contained after the negative electrode current collector is brought into contact with the negative electrode layer.

The inventors found that a reaction of Fe and the sulfide solid electrolyte is promoted under an environment that exceeds 125° C. Therefore, a step where a contact portion of the negative electrode layer with the negative electrode current collector becomes 125° C. or more may not be contained after the negative electrode current collector that contains Fe is brought into contact with the negative electrode layer. Thus, the reaction of the metal contained in the negative electrode current collector and the sulfide solid electrolyte contained in the negative electrode layer can be suppressed in the contact portion of the negative electrode layer with the negative electrode current collector. As a result, the capacity of the all-solid battery can be suppressed from decreasing.

Further, the second aspect of the invention described above may include a step of preparing a mock all-solid battery that is provided with a negative electrode layer, a positive electrode layer, a solid electrolyte layer disposed between the negative electrode layer and the positive electrode layer, a mock current collector connected to the negative electrode layer, and a positive electrode current collector connected to the positive electrode layer using the mock current collector that does not react with the sulfide solid electrolyte contained in the negative electrode layer and has electric conductivity, a step of charging the mock all-solid battery, and a step of replacing the mock current collector with a negative electrode current collector.

The inventors found that in a state where a potential of the negative electrode current collector was low, the metal contained in the negative electrode current collector and the sulfide solid electrolyte contained in the negative electrode layer slightly reacted even at room temperature in some cases. Therefore, when the mock current collector is replaced with the negative electrode current collector after the mock all-solid battery prepared with the mock current collector such as described above was charged to a certain extent, since a potential of the negative electrode current collector is high to a certain extent, in the contact portion of the negative electrode layer with the negative electrode current collector, the reaction between the metal contained in the negative electrode current collector and the sulfide solid electrolyte contained in the negative electrode layer can further be suppressed. As a result, the capacity of the all-solid battery can further be suppressed from decreasing.

According to the invention, an all-solid battery in which the capacity is suppressed from decreasing and a negative electrode layer contains sulfur, and a method for manufacturing the all-solid battery can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The operation and effects described above of the invention become obvious from a mode for carrying out the invention described below. Hereinafter, the invention will be described based on embodiments shown in the drawings. However, the invention is not limited to these embodiments. In the drawings shown below, for the purpose of easy understanding, magnitudes and shapes of constituent elements may be exaggerated in some cases.

1. All-Solid Battery

Figure 1:
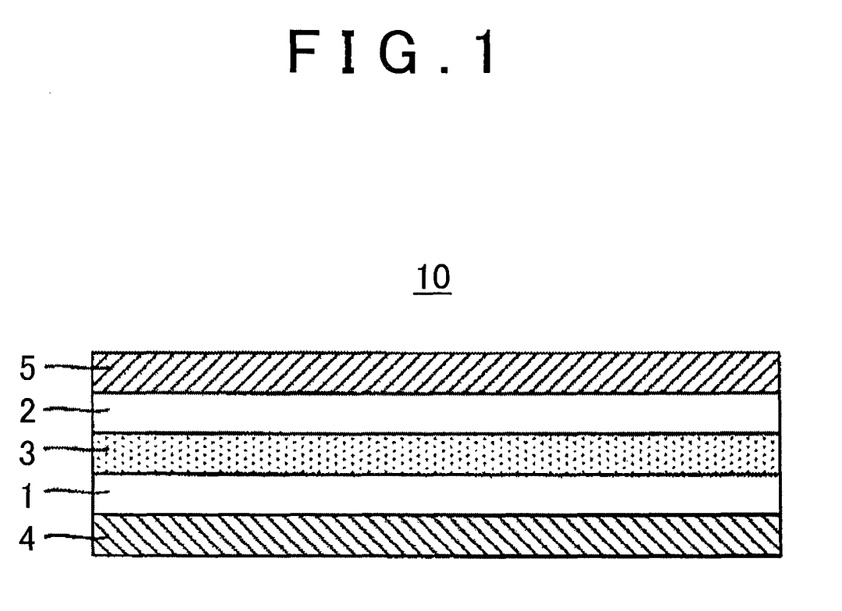
FIG. 1 is a sectional view for describing an all-solid battery 10.

FIG. 1 is a sectional view that describes an all-solid battery 10 of the invention. In FIG. 1, an external body for housing an electrode layer and a solid electrolyte layer is omitted from describing.

As shown in FIG. 1, the all-solid battery 10 includes a negative electrode layer 1, a positive electrode layer 2, a solid electrolyte layer 3 sandwiched therebetween, a negative electrode current collector 4 connected to the negative electrode layer 1, and a positive electrode current collector 5 connected to the positive electrode layer 2. Hereinafter, these constituent elements will be described.

(Negative Electrode Layer 1)

The negative electrode layer 1 is a layer that includes a negative electrode active material and a sulfide solid electrolyte.

As the negative electrode active material that is contained in the negative electrode layer 1, known negative electrode active materials that can be used in an all-solid battery can appropriately be used. As such negative electrode active materials, for example, a carbon active material, an oxide active material and a metal active material can be used. The carbon active material is not particularly limited as long as it contains carbon and, for example, mesocarbon microbeads (MCMB), highly-ordered pyrolytic graphite (HOPG), hard carbon, and soft carbon can be used. As the oxide active material, for example, $Nb_2O_5$, $Li_4Ti_5O_{12}$ and $SiO$ can be used. As the metal active material, for example, In, Al, Si, Sn and alloys thereof can be used. Further, as the negative electrode active material, a lithium-containing metal active material may be used. As the lithium-containing active material, as long as it is an active material that contains at least Li, it is not particularly limited, that is, a lithium metal may be used, and a lithium alloy may be used. As the lithium alloy, for example, an alloy that contains Li and at least one kind of In, Al, Si and Sn can be used. A shape of the negative electrode active material may be in any form of particle and thin film, for example. An average particle size (D50) of the negative electrode active material is preferably 1 nm or more and 100 μm or less, for example, and more preferably 10 nm or more and 30 μm or less. A content of the negative electrode active material in the negative electrode layer 1 is not particularly limited but preferably set to 40% by mass or more and 99% by mass or less.

Further, as the sulfide solid electrolyte that is contained in the negative electrode layer 1, known sulfide solid electrolytes that can be used in the negative electrode layer of the all-solid battery can appropriately be used. As such sulfide solid electrolyte, sulfide-based amorphous solid electrolytes such as $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$ and $Li_3PS_4$ can be used. When the sulfide solid electrolyte is used as the solid electrolyte, the performance of the all-solid battery 10 may be readily improved.

Further, a conductive assistant for improving the electric conductivity may be contained in the negative electrode layer 1. As the conductive assistant, known conductive assistants that can be used in the all-solid battery can appropriately be used. For example, other than carbon materials such as vapor-grown carbon fiber, acetylene black (AB), Ketjen black (KB), carbon nanotube (CNT), and carbon nanofiber (CNF), a metal material that can withstand an environment when the all-solid battery is used can be used.

Further, a binder for binding the negative electrode active material and the sulfide solid electrolyte may be contained in the negative electrode layer 1. As the binder, known binders that can be contained in the negative electrode layer of the all-solid battery can appropriately be used. Examples of such binders include butylene rubber (BR), acrylonitrile butadiene rubber (ABR), butadiene rubber (BR), polyvinylidene fluoride (PVdF) and styrene butadiene rubber (SBR).

When the negative electrode layer 1 is prepared using a slurry-like composition for negative electrode layer prepared by dispersing the negative electrode active material and so on in a liquid, as a liquid in which the negative electrode active material and so on are dispersed, heptane can be used, and a nonpolar solvent can preferably be used. A thickness of the negative electrode layer is preferably 0.1 μm or more and 1 mm or less, for example, and more preferably 1 μm or more and 100 μm or less. Further, in order to make it easy to improve the performance of the all-solid battery, the negative electrode layer 1 is preferably prepared through a process of pressing.

It was found that in a conventional all-solid battery that includes a negative electrode layer that contains a sulfide solid electrolyte, a sulfur compound generated by a reaction between a solid electrolyte contained in the negative electrode layer and a metal contained in a negative electrode current collector is present in a contact portion of the negative electrode layer and the negative electrode current collector. This is considered that the sulfur compound is generated by a reaction of the solid electrolyte contained in the negative electrode layer and the metal contained in the negative electrode current collector in the process of manufacturing the all-solid battery. The sulfur compound has properties that a Li ion is inserted but not released under a general use environment of battery. Therefore, when the sulfur compound is generated in a contact portion of the negative electrode layer with negative electrode current collector, capacity of the all-solid battery decreases. On the other hand, the all-solid battery 10 does not contain the sulfur compound such as described above in a contact portion of the negative electrode layer 1 with the negative electrode current collector 4. "That a sulfur compound is not present" means that in a measurement result by energy dispersive X-ray spectroscopy (EDX), a molar amount of the metal element/a molar amount of sulfur (S) that constitute the sulfur compound is 0.01 or less. For example, when Cu is contained in the negative electrode current collector 4, a molar amount of Cu/a molar amount of sulfur is 0.01 or less. Therefore, capacity of the all-solid battery 10 can be suppressed from decreasing. A method for manufacturing an all-solid battery without allowing the sulfur compound to exist in the contact portion of the negative electrode layer and the negative electrode current collector like this will be described in detail below.

(Positive Electrode Layer 2)

The positive electrode layer 2 is a layer that contains a positive electrode active material and a solid electrolyte.

As the positive electrode active material contained in the positive electrode layer 2, known positive electrode active materials that can be used in the all-solid battery can appropriately be used. As such positive electrode active material, other than layered active materials such as lithium cobalt oxide ($LiCoO_2$) and lithium nickel oxide ($LiNiO_2$), different element-substituted Li—Mn spinel having a composition represented by $Li_{1+x}Ni_{1/3}Mn_{1/3}Co_{1/3}O_2$ (X is a positive number.), lithium manganate ($LiMn_2O_4$), $Li_{1+x}Mn_{2-x-y}M_yO_4$ (M is one or more kinds selected from Al, Mg, Co, Fe, Ni and Zn. X and y are positive numbers.), and metal lithium phosphates represented by $LiMPO_4$ (M is Fe, Mn, Co, or Ni.) can be used. A shape of the positive electrode active material may be any of particle and thin film, for example. An average particle size (D50) of the positive electrode active material is preferably 1 nm or more and 100 μm or less, for example, and more preferably 10 nm or more and 30 μm or less. Further, a content of the positive electrode active material in the positive electrode layer 2 is not particularly limited but is preferably set to 40% by mass or more and 99% by mass or less, for example.

Further, as the solid electrolyte that is contained in the positive electrode layer 2, known solid electrolytes that can be used in the all-solid battery can appropriately be used. As such solid electrolytes, other than oxide-based amorphous solid electrolytes such as $Li_2O$—$B_2O_3$—$P_2O_5$ and $Li_2O$—$SiO_2$ and sulfide-based amorphous solid electrolytes such as $Li_2S$—$SiS_2$, LiI—$Li_2S$—$SiS_2$, LiI—$Li_2S$—$P_2S_5$, LiI—$Li_2S$—$P_2S_5$, LiI—$Li_3PO_4$—$P_2S_5$, $Li_2S$—$P_2S_5$, and $Li_3PS_4$, crystalline oxides/oxynitrides such as LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (W is w<1.), and $Li_{3.6}Si_{0.6}P_{0.4}$ can be used. However, from the viewpoint of making it easy to improve the performance of the all-solid battery, the sulfide solid electrolyte is preferably used as the solid electrolyte.

When the sulfide solid electrolyte is used as the solid electrolyte contained in the positive electrode layer 2, a high resistance layer may be formed in an interface of the positive electrode active material with the sulfide solid electrolyte. From the viewpoint of making it easy to suppress the battery resistance from increasing by suppressing the high resistance layer from being formed, the positive electrode active material is preferably coated with a coat layer that contains an ion conductive oxide. The coat layer may contain a substance that has lithium ion conductivity and can maintain a form without flowing even when brought into contact with the positive electrode active material or the sulfide solid electrolyte. As the ion conductive oxide contained in the coat layer that coats the positive electrode active material, for example, oxides represented by a formula $Li_xAO_y$ (A is B, C, Al, Si, P, S, Ti, Zr, Nb, Mo, Ta or W. X and y are positive numbers.) can be used. Specifically, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$ can be used. Further, the lithium ion conductive oxide may be a composite oxide. As the composite oxide, optional combinations of the lithium ion conductive oxides can be adopted. For example, $Li_4SiO_4$—$Li_3BO_3$ and $Li_4SiO_4$—$Li_3PO_4$ can be used. Further, when a surface of the positive electrode active material is coated with the ion conductive oxide, the ion conductive oxide may at least coat a part of the positive electrode active material or may coat an all surface of the positive electrode active material. Further, a thickness of the ion conductive oxide that coats the positive electrode active material is preferably 0.1 nm or more and 100 nm or less, for example, and more preferably 1 nm or more and 20 nm or less. The thickness of the ion conductive oxide can be measured by a transmission electron microscope (TEM), for example.

Further, the positive electrode layer 2 may contain a conductive assistant for improving the electric conductivity, a binder for binding the positive electrode active material and the solid electrolyte, or, as required, a thickener.

As the conductive assistant contained in the positive electrode layer 2, known conductive assistants that can be used in the solid battery can properly be used. For example, other than carbon materials such as vapor-grown carbon fiber, acetylene black (AB), Ketjen black (KB), carbon nanotube (CNT) and carbon nanofiber (CNF), a metal material that can withstand an environment when the solid battery is used can be used.

As the binder contained in the positive electrode layer 2, known binders that can be contained in the positive electrode layer of the solid battery can appropriately be used. As such a binder, butylene rubber (BR), acrylonitrile butadiene rubber (ABR), butadiene rubber (BR), polyvinylidene fluoride (PVdF), and styrene butadiene rubber (SBR) can be used.

Further, when the positive electrode layer 2 is prepared using a slurry-like composition for positive electrode layer prepared by dispersing the positive electrode active material in a liquid, as a liquid that can be used, heptane can be used, and a nonpolar solvent can preferably be used. A thickness of the positive electrode layer 2 is preferably 0.1 μm or more and 1 mm or less, for example, and more preferably 1 μm or more and 100 μm or less. In order to make it easy to improve performance of the all-solid battery 10, the positive electrode layer 2 is preferably prepared through a process of pressing.

(Solid Electrolyte Layer 3)

The solid electrolyte layer 3 is a layer that contains a solid electrolyte.

As the solid electrolyte contained in the solid electrolyte layer 3, known solid electrolytes that can be used in the solid electrolyte layer of the all-solid battery can appropriately be used. As such a solid electrolyte, the solid electrolytes that can be contained in the positive electrode layer 2 can be used. Other than those described above, a binder can be contained in the solid electrolyte layer 3. As the binder than is contained in the solid electrolyte layer, known binders that can be used in the solid electrolyte layer of the all-solid battery can appropriately be used. As such a binder, the binders that can be contained in the positive electrode layer 2 can be used.

When the solid electrolyte layer 3 is prepared through a process where a slurry-like composition for solid electrolyte prepared by dispersing the solid electrolyte and so on in a liquid is coated on the positive electrode layer or negative electrode layer, as the liquid for dispersing the solid electrolyte, heptane can be used, and a nonpolar solvent can preferably be used. A content of the solid electrolyte in the solid electrolyte layer 3 is 60% by mass or more, for example, 70% by mass or more, above all, and preferably 80% by mass or more, in particular. A thickness of the solid electrolyte layer 3 largely differs depending on a structure of the all-solid battery 10, but is preferably 0.1 μm or more and 1 mm or less, for example, and more preferably 1 μm or more and 100 μm or less.

(Negative Electrode Current Collector 4)

The negative electrode current collector 4 is formed of a known conductive material that can be used as the negative electrode current collector of the all-solid battery and contains a metal that can react with the sulfide solid electrolyte contained in the negative electrode layer 1. "A metal that can react with a sulfide solid electrolyte" means a metal that generates a sulfur compound when heated in contact with the sulfide solid electrolyte. Specific examples of such metals include Cu, Fe, Ni, Co and Ti. Therefore, the negative electrode current collector 4 can be formed with a metal material that contains one, two or more elements selected from the group of Cu, Fe, Ni, Co, and Ti, for example, or the metal material plated or deposited with a conductive material such as another metal material or a carbon material. Such a negative electrode current collector 4 may be in any of a foil shape or a mesh shape, for example.

(Positive Electrode Current Collector 5)

The positive electrode current collector 5 can be formed with a known conductive material that can be used as the positive electrode current collector of the all-solid battery. Therefore, the positive electrode current collector 5 can be formed, for example, with stainless steel or a metal material that contains one, two or more elements selected from the group of stainless steel, Ni, Cr, Au, Pt, Al, Fe, Ti and Zn. Further, the positive electrode current collector 5 can have any form of foil and mesh, for example.

(Other Structure)

Although not shown in the drawings, the all-solid battery 10 can be used in a state hermetically sealed in an external body such as a laminate film. As such a laminate film, a resinous laminate film or a film obtained by depositing a metal on the resinous laminate film can be used.

2. Method for Manufacturing all-Solid Battery

Figure 2:
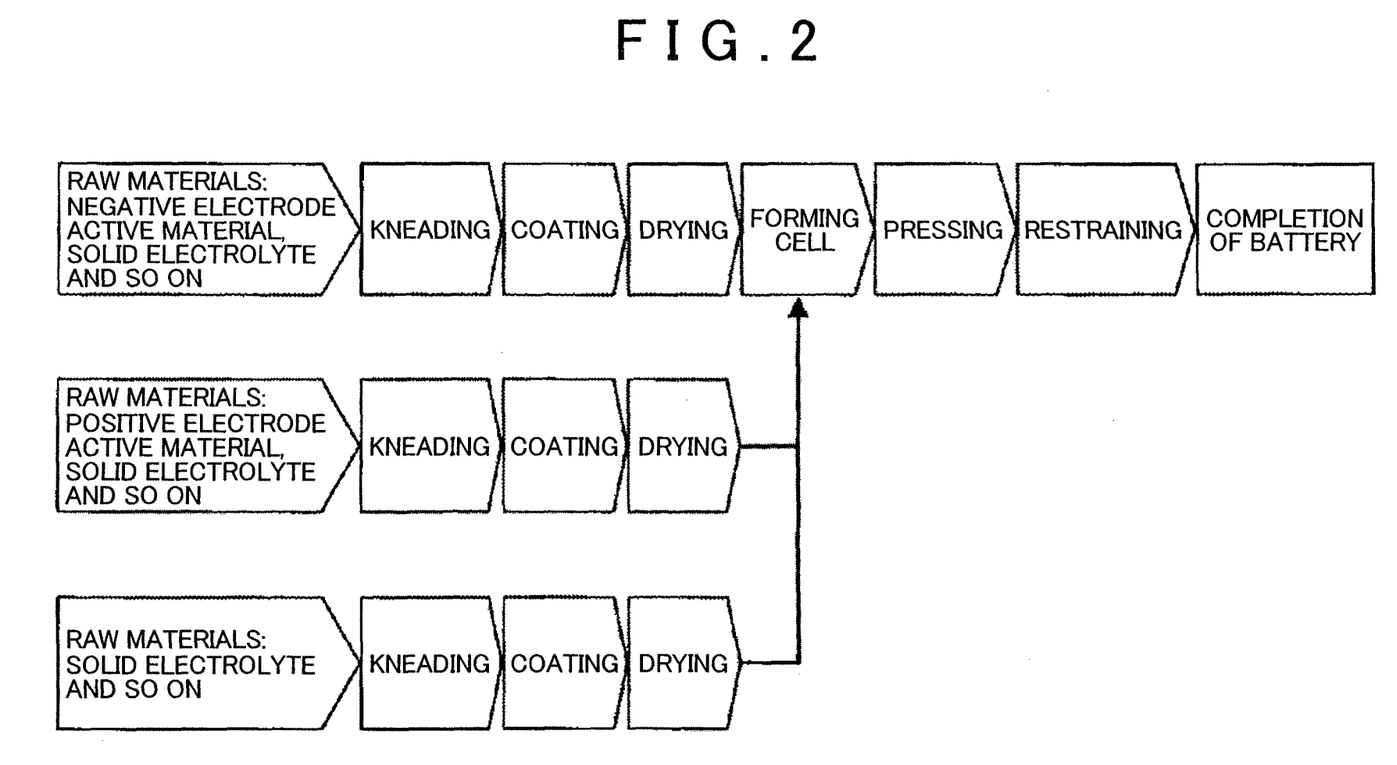
FIG. 2 is a diagram that describes a method for manufacturing a general all-solid battery.

Next, a method for manufacturing an all-solid battery of the invention will be described. First, a flow of a general method for manufacturing an all-solid battery will briefly be described with reference to FIG. 2. FIG. 2 is a diagram for describing a general method for manufacturing an all-solid battery.

When an all-solid battery is manufactured, first, respective raw materials that form the positive electrode layer, the negative electrode layer and the solid electrolyte layer are prepared. These materials are as described above. After preparation of these raw materials, when the respective materials are kneaded, coated and dried, the positive electrode layer, the negative electrode layer and the solid electrolyte layer can be formed. Then, after the positive electrode current collector, the positive electrode layer, the solid electrolyte layer, the negative electrode layer and the negative electrode current collector are laminated into a cell, the cell is pressed in a lamination direction and restrained, thus an all-solid battery can be manufactured. In the manufacturing process of the all-solid battery, raw materials are exposed to a high temperature environment in a step of drying (drying step) and a step of pressing (pressing step).

The inventors found that at high temperatures in the manufacturing process of the all-solid battery as described above, the sulfide solid electrolyte contained in the negative electrode layer reacted with the metal contained in the negative electrode current collector to form a sulfur compound that decreased capacity of the all-solid battery. Hereinafter, experimental results of generation of such a sulfur compound will be shown.

Figure 3:
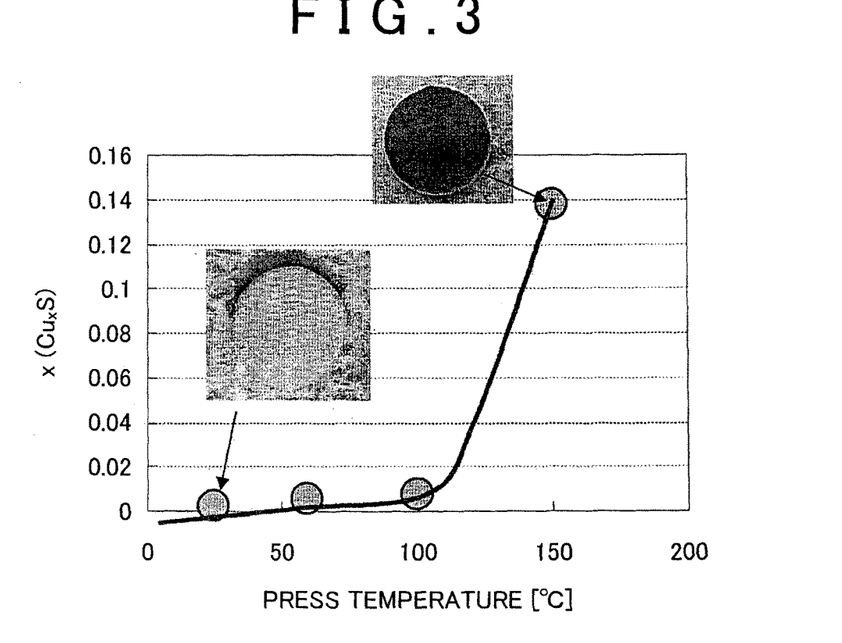
FIG. 3 is a diagram that shows a relationship between a press temperature and a generation amount of copper sulfide.
Figure 4:
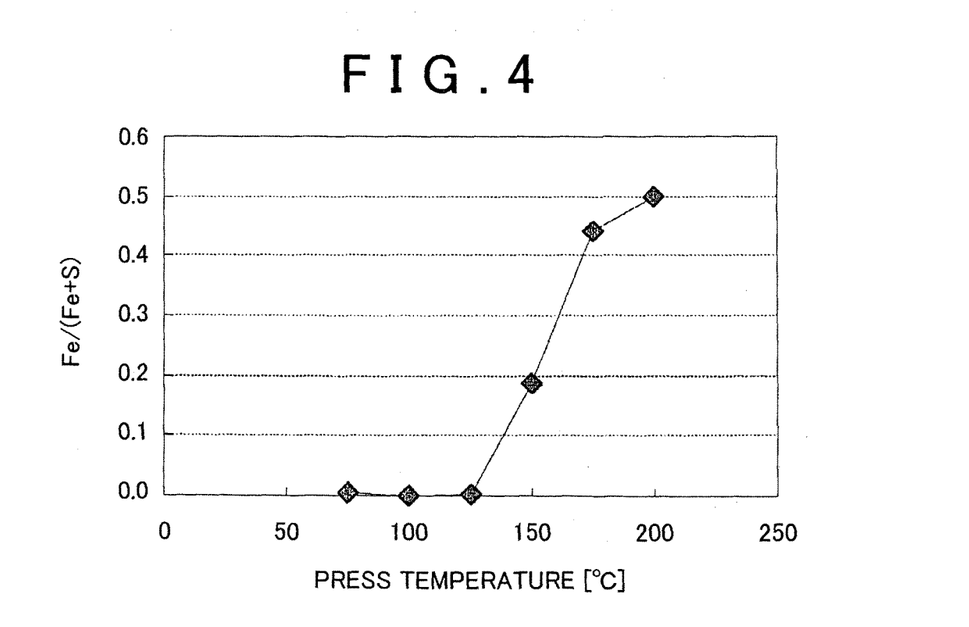
FIG. 4 is a diagram that shows a relationship between the press temperature and a generation amount of iron sulfide.

According to a method described below, a relationship between an amount of the sulfur compound generated by a reaction of the sulfide solid electrolyte and the metal and a temperature was investigated. Results thereof are shown in FIG. 3 and FIG. 4. FIG. 3 is for the case where Cu was used as the metal and shows a relationship between a generation amount of copper sulfide and a temperature. FIG. 4 is for the case where Fe was used as the metal and shows a relationship between a generation amount of iron sulfide and a temperature.

First, after a sulfide solid electrolyte (LiI—Li$_2$S—P$_2$S$_5$) was pressed (preliminary press step: 98 MPa), a metal foil (Cu or Fe) was placed on the sulfide solid electrolyte and pressed (principal press step: at 392 MPa for 20 minutes). After that, the metal foil was peeled off from the sulfide solid electrolyte and a portion of the metal foil that was in contact with the sulfide solid electrolyte was subjected to element analysis by energy dispersive X-ray analysis (EDX). Relationships between a heating temperature during principal press and a generation amount of the sulfide by the element analysis are shown in FIG. 3 and FIG. 4. FIG. 3 shows a photograph of a surface state of a portion of the sulfide solid electrolyte that was in contact with the Cu foil when a heating temperature during the principal press was 25° C., and a photograph of a surface state of a portion of the sulfide solid electrolyte that was in contact with the Cu foil when a heating temperature during principal press was 150° C.

As shown in FIG. 3, it was found that a reaction between Cu and the sulfide solid electrolyte was promoted when the temperature exceeded 100° C. Further, as shown in FIG. 3, whether copper sulfide was generated or not could visually be observed. On the other hand, it was found that a reaction between Fe and the sulfide solid electrolyte was promoted when the temperature exceeded 125° C. as shown in FIG. 4.

Based on the above findings, a method for manufacturing an all-solid battery of the invention is as follows. That is, a method for manufacturing an all-solid battery of the invention is a method for manufacturing an all-solid battery that at least includes a negative electrode layer that includes a negative electrode active material and a sulfide solid electrolyte, and a negative electrode current collector that is in contact with the negative electrode layer and includes a metal that can react with the sulfide solid electrolyte, in which the method does not contain a step where a contact portion of the negative electrode layer and the negative electrode current collector becomes a temperature at which the metal contained in the negative electrode current collector and the sulfide solid electrolyte contained in the negative electrode layer react or more after the negative electrode current collector was brought into contact with the negative electrode layer. For example, when the metal contained in the negative electrode current collector is Cu, a step where a contact portion of the negative electrode layer and the negative electrode current collector exceeds 100° C. or more is not contained after the negative electrode current collector was is brought into contact with the negative electrode layer. Further, when the metal contained in the negative electrode current collector is Fe, a step where a contact portion of the negative electrode layer and the negative electrode current collector exceeds 125° C. is not contained after the negative electrode current collector was brought into contact with the negative electrode layer.

Hereinafter, a method for manufacturing an all-solid battery of the invention will more specifically be described.

As described above, when the negative electrode layer containing the sulfide solid electrolyte and the negative electrode current collector containing the specified metal are left in a high temperature environment in a contact state thereof, the sulfur compound that decreases capacity of the all-solid battery is generated in a contact portion of the negative electrode layer and the negative electrode current collector. It is mainly in the drying step and pressing step that raw materials are left in a high temperature environment in the manufacturing process of the all-solid battery. Therefore, the method for manufacturing the all-solid battery of the invention is preferably conducted such that at least in the drying step and the pressing step, the negative electrode layer and the negative electrode current collector are not brought into contact with each other. That is, it is preferable that the negative electrode layer is connected with the negative electrode current collector after the drying step and pressing step. A specific example is as follows.

The positive electrode layer can be formed through a process where a slurry-like composition for positive electrode layer containing the positive electrode active material and the solid electrolyte is coated on a surface of the positive electrode current collector and dried. The negative electrode layer can be formed through a process where a slurry-like composition for negative electrode layer containing the negative electrode active material and the sulfide solid electrolyte is coated on a surface of a base material that does not react with the sulfide solid electrolyte and dried. The solid electrolyte layer can be formed through a process where a slurry-like composition for solid electrolyte layer containing the solid electrolyte and the binder is coated on a surface of the positive electrode layer or negative electrode layer that was formed as described above and dried. Thereafter, a laminate body is prepared in such a manner that the base material, the negative electrode layer, the solid electrolyte layer, the positive electrode layer and the positive electrode current collector are laminated such that the solid electrolyte layer is sandwiched between the positive electrode layer and the negative electrode layer. After the laminate body is pressed, the base material is peeled off from the negative electrode layer, and the negative electrode current collector is connected with the negative electrode layer. Through such a process, the all-solid battery can be manufactured such that the negative electrode current collector is connected with the negative electrode layer after the drying step and press step. The base material that is used in the method is not particularly limited as long as it does not react with the sulfide solid electrolyte contained in the negative electrode layer in a period from the formation of the negative electrode layer to peeling off from the negative electrode layer. Specific examples of such base materials include a sheet made of a resin such as polyethylene terephthalate and an aluminum foil.

Further, the all-solid battery can also be manufactured as shown below without using the base material such as described above. That is, the positive electrode layer is formed on the positive electrode current collector, on the positive electrode layer the solid electrolyte layer is formed, and on the solid electrolyte layer the negative electrode layer is formed, thus a laminate body where the positive electrode current collector, the positive electrode layer, the solid electrolyte layer, and the negative electrode layer are laminated is prepared. Further, the laminate body is pressed in a lamination direction, and thereafter, the negative electrode current collector is connected with the negative electrode layer. As described above, each of the positive electrode layer, the solid electrolyte layer, and the negative electrode layer can be formed through a process where the slurry-like composition is coated and dried. Also through such processes, the all-solid battery can be manufactured by connecting the negative electrode current collector with the negative electrode layer after the drying step and the press step.

Incidentally, in the manufacturing example of the all-solid battery described above, a method where materials that constitute the respective layers were formed into a slurry-like composition, and the slurry-like composition is coated and dried was exemplified for each of the positive electrode layer, the negative electrode layer and the solid electrolyte layer. However, the invention is not limited to such a mode. For example, a dry process such as a vapor deposition process or an electrostatic powder coating process may be used to form the positive electrode layer, the negative electrode layer, and the solid electrolyte layer.

As described above, the temperature has a large influence on the formation of the sulfur compound in a contact portion of the negative electrode layer and the negative electrode current collector. However, the inventors found that in a state where a potential of the negative electrode current collector was low, the metal contained in the negative electrode current collector slightly reacted with the sulfide solid electrolyte contained in the negative electrode layer even under room temperature. Therefore, the method for manufacturing the all-solid battery of the invention is preferable to be a method such as shown below. That is, the method is a method for manufacturing an all-solid battery that includes: a step of preparing a mock all-solid battery that is provided with a negative electrode layer, a positive electrode layer, a solid electrolyte layer disposed between the negative electrode layer and the positive electrode layer, a mock current collector connected to the negative electrode layer, and a positive electrode current collector connected to the positive electrode layer, using the mock current collector that does not reacts with the sulfide solid electrolyte contained in the negative electrode layer and has electric conductivity; a step of charging the mock all-solid battery to a certain extent; and a step of replacing the mock current collector with a negative electrode current collector after charging the mock all-solid battery to a certain extent.

The process for preparing the mock all-solid battery can be the same as a method for manufacturing a conventional all-solid battery except that the mock current collector is used in place of the negative electrode current collector. For example, according to a method that uses the base material such as described above, a laminate body in which the base material, the negative electrode layer, the solid electrolyte layer, the positive electrode layer and the positive electrode current collector are laminated is prepared, after the laminate body is pressed, the base material is replaced with the mock current collector, thus, a mock all-solid battery can be prepared. When what can be used also as the mock current collector is used as the base material, the step of replacing the base material with the mock current collector is not necessary, and the base material can be used as the mock current collector. Also according to a method in which after the positive electrode layer is formed on the positive electrode current collector, the solid electrolyte payer is formed on the positive electrode layer, the negative electrode layer is formed on the solid electrolyte layer, and a laminate body obtained by laminating the positive electrode' current collector, the positive electrode layer, the solid electrolyte layer, and the negative electrode layer is prepared, the laminate body is pressed in a lamination direction, and after that the mock current collector is connected with the negative electrode layer, a mock all-solid battery can be prepared. The mock current collector is not particularly limited as long as it does not react with the sulfide solid electrolyte contained in the negative electrode layer in the above process and has electric conductivity.

As described above, when after the mock all-solid battery that was prepared with the mock current collector in place of the negative electrode current collector was charged to a certain extent, the mock current collector is replaced with the negative electrode current collector, since a potential of the negative electrode current collector is increased to a certain extent, a reaction of the metal contained in the negative electrode current collector with the sulfide solid electrolyte contained in the negative electrode layer can be further suppressed in a contact portion of the negative electrode layer with the negative electrode current collector. As a result, it becomes easy to further suppress the capacity of the all-solid battery from decreasing.

To what extent the mock all-solid battery is charged depends on a kind of the metal contained in the negative electrode current collector. When Cu is used as the negative electrode current collector, for example, charge may be conducted such that a battery voltage becomes 3.0 V or more. Herein, that "battery voltage is 3.0 V or more" means a state where a potential of the negative electrode current collector is about 2.0 V (vs. Li potential) or less.

1. Preparation of all-Solid Battery

Example 1

An all-solid battery according to Example 1 was prepared as shown below.

(Preparation of Positive Electrode Layer)

Butyl butyrate, a butyl butyrate solution of 5% by mass of a polyvinylidene fluoride (PVdF)-based binder, $LiNi_{1/3}Co_{1/3}Mn_{1/3}O_2$ having an average particle size of 4 μm as the positive electrode active material, $Li_2S$—$P_2S_5$-based glass ceramic containing LiI having an average particle size of 0.8 μm as the sulfide solid electrolyte, and vapor-grown carbon fiber (VGCF (registered trade mark)) as the conductive assistant were charged in a polypropylene container and the mixture was stirred for 30 seconds by an ultrasonic disperser (UH-50, manufactured by SMT Co., Ltd.). Then, after the container was shaken by a shaker (TTM-1, manufactured by Shibata Scientific Technology Ltd.) for 3 minutes, the container was further stirred for 30 seconds by the ultrasonic disperser, thus a composition for positive electrode layer was prepared. Next, the composition for positive electrode layer was coated on the positive electrode current collector according to a blade method using an applicator, dried for 30 minutes on a hot-plate at 100° C., thus the positive electrode layer was formed. As a positive electrode current collector, a carbon-coated Al foil (SDX (registered trade mark), manufactured by SHOWA Denko K.K.) was used.

(Preparation of Negative Electrode Layer)

Butyl butyrate, a butyl butyrate solution of 5% by mass of a polyvinylidene fluoride (PVdF)-based binder, natural graphite-based carbon (manufactured by Mitsubishi Chemical Co., Ltd.) having an average particle size of 10 μm as the negative electrode active material and $Li_2S$—$P_2S_5$-based glass ceramic containing LiI having an average particle size of 1.5 μm as the sulfide solid electrolyte were charged in a polypropylene container, the mixture was stirred for 30 seconds by a ultrasonic disperser (UH-50, manufactured by SMT Co., Ltd.). Then, the container was shaken for 30 minutes by a shaker (TTM-1, manufactured by Shibata Scientific Technology Ltd.), thus the composition for negative electrode layer was prepared. Next, the composition for negative electrode layer was coated on the base material according to a blade method using an applicator, dried for 30 minutes on a hot-plate at 100° C., thus, the negative electrode layer was formed. As the base material, an Al foil was used.

(Preparation of Solid Electrolyte Layer)

A heptane solution of 5% by mass of butylene rubber (BR)-based binder and $Li_2S$—$P_2S_5$-based glass ceramic containing LiI and having an average particle size of 2.5 μm as the solid electrolyte were charged in a polypropylene container, the mixture was stirred for 30 seconds by an ultrasonic disperser (UH-50, manufactured by SMT Co., Ltd.). Then, the container was shaken for 30 minutes by a shaker (TTM-1, manufactured by Shibata Scientific Technology Ltd.), thus the composition for solid electrolyte layer was prepared. Next, the composition for solid electrolyte layer was coated on the Al foil according to a blade method using an applicator and dried for 30 minutes on a hot-plate at 100° C., thus the solid electrolyte layer was formed.

(Preparation of All-Solid Battery)

After the solid electrolyte layer was charged in a tubular ceramics having an inner sectional area of 1 cm² and pressed under 98 MPa, the positive electrode current collector and positive electrode layer were charged such that the positive electrode layer comes into contact with one surface side of the solid electrolyte layer and further pressed at 98 MPa. After the press, the Al foil was peeled off from the solid electrolyte layer. Thereafter, the base material and the negative electrode layer were charged such that the negative electrode layer comes into contact with the other surface (a surface from which the Al foil was peeled) side of the solid electrolyte layer and pressed under 98 MPa. Thereafter, the base material was peeled off from the negative electrode layer and the laminate body made of the positive electrode current collector, the positive electrode layer, the solid electrolyte layer and the negative electrode layer was pressed (hereinafter, the press is referred to as "principal press"). Condition of the principal press is 588 MPa for 5 minutes at 25° C. After the principal press, the laminate body was restrained under 44 MPa. Thereafter, the all-solid battery was completed by connecting the negative electrode current collector to the negative electrode layer. A Cu foil was used as the negative electrode current collector.

Example 2

An all-solid battery according to Example 2 was prepared in the same manner as Example 1 except that the condition of the principal press was changed from "588 MPa for 5 minutes at 25° C." to "588 MPa for 20 minutes at 150° C.".

Example 3

After the laminate body was restrained at 44 MPa in the same manner as Example 1, constant current-constant voltage charge was conducted up to 3.0 V at a time rate of 3 (1/3 C). Thereafter, the negative electrode current collector (Cu foil) was connected to the negative electrode layer, an all-solid battery according to Example 3 was prepared.

Comparative Example 1

An all-solid battery according to Comparative Example 1 was prepared in the same manner as Example 1 except that the negative electrode layer was formed not on the base material but on the negative electrode current collector (Cu foil). Incidentally, since the negative electrode current collector was used in place of the base material, the step of peeling the base material in Example 1 was not conducted.

Comparative Example 2

An all-solid battery according to Comparative Example 2 was prepared in the same manner as Example 2 except that the negative electrode layer was formed not on the base material but on the negative electrode current collector (Cu foil). Incidentally, since the negative electrode current collector was used in place of the base material, the step of peeling the base material in Example 2 was not conducted.

2. Evaluation of Initial Performance

After the all-solid batteries according to the respective Examples prepared as shown above were subjected to a constant current-constant voltage charge (end current 1/100 C) up to 4.55 V at a time rate of 3 (1/3 C), further after 15 minutes rest, constant current-constant voltage discharge (end current 1/100 C) was conducted up to 3.00 V at a time rate of 3 (1/3 C). Measurement results of initial discharge capacities at this time are shown in Table 1. Incidentally, in Table 1, temperatures at which the respective layers were dried (drying temperature), temperatures during the principal press (press temperature), and timings when the negative electrode current collector was connected to the negative electrode (adhesion of Cu) are shown together.

TABLE 1

| | Drying temperature | Press temperature | Adhesion of Cu foil | Initial charge capacity (⅓ CCCV) [mAh/g] |
|---|---|---|---|---|
| Example 1 | 100° C. | 25° C. | After press | 203 |
| Example 2 | 100° C. | 150° C. | After press | 200 |
| Example 3 | 100° C. | 25° C. | After 3.0 V charge | 205 |
| Comparative Example 1 | 100° C. | 25° C. | Before drying | 192 |
| Comparative Example 2 | 100° C. | 150° C. | Before drying | 174 |

As obvious from results shown in Table 1, compared with the all-solid batteries according to Comparative Example 1 and 2 where the negative electrode layer and the negative electrode current collector were heated at a high temperature in a contact state, the all-solid batteries according to Examples 1 to 3 where the negative electrode current collector was connected to the negative electrode layer after the drying step and the press step had high initial discharge capacities. This is considered because the all-solid batteries according to Example 1 to 3 were not placed under a high temperature environment in a state where the negative electrode layer was in contact with the negative electrode current collector, the sulfur compound was suppressed from being generated in a contact portion of the negative electrode layer with the negative electrode current collector. Further, the all-solid battery according to Example 3 where, after charge, the negative electrode current collector was connected to the negative electrode layer had the highest initial discharge capacity.

The invention claimed is:

1. A method for manufacturing an all-solid battery provided with at least a negative electrode layer containing a negative electrode active material and a sulfide solid electrolyte, and a negative electrode current collector containing one, two or more elements selected from the group of Cu, Fe, Ni, Co, and Ti that is in contact with the negative electrode layer comprising:
   preparing a mock all-solid battery provided with the negative electrode layer, a positive electrode layer, a solid electrolyte layer disposed between the negative electrode layer and the positive electrode layer, a mock current collector connected to the negative electrode layer using the mock current collector that does not react with the sulfide solid electrolyte contained in the negative electrode layer and has electric conductivity;
   charging the mock all-solid battery; and
   replacing the mock current collector with the negative electrode current collector after the mock all-solid battery was charged.

2. The method for manufacturing an all-solid battery according to claim 1, wherein the element contained in the negative electrode current collector is Cu and a contact portion of the negative electrode layer with the negative electrode current collector does not exceed 100° C. after the negative electrode current collector was brought into contact with the negative electrode layer.

3. The method for manufacturing an all-solid battery according to claim 1, wherein the element contained in the negative electrode current collector is Fe, and a contact portion of the negative electrode layer with the negative electrode current collector does not exceed 125° C. after the negative electrode current collector was brought into contact with the negative electrode layer.

* * * * *